United States Patent
Lu

(10) Patent No.: US 12,065,581 B2
(45) Date of Patent: Aug. 20, 2024

(54) DURABLE NATURAL FABRIC PRODUCTS

(71) Applicant: Ziqiang Lu, Red Wing, MN (US)

(72) Inventor: Ziqiang Lu, Red Wing, MN (US)

( * ) Notice: Subject to any disclaimer, the term of this patent is extended or adjusted under 35 U.S.C. 154(b) by 248 days.

(21) Appl. No.: 16/369,284

(22) Filed: Mar. 29, 2019

(65) Prior Publication Data
US 2019/0309173 A1 Oct. 10, 2019

Related U.S. Application Data

(60) Provisional application No. 62/761,699, filed on Apr. 4, 2018.

(51) Int. Cl.
| | |
|---|---|
| C09D 5/00 | (2006.01) |
| C09D 129/14 | (2006.01) |
| C09D 133/04 | (2006.01) |
| C09D 163/00 | (2006.01) |
| C09D 167/08 | (2006.01) |
| C09D 175/04 | (2006.01) |
| C09D 195/00 | (2006.01) |
| D06N 3/00 | (2006.01) |
| D06N 3/04 | (2006.01) |
| D06N 3/14 | (2006.01) |
| D06N 3/18 | (2006.01) |

(52) U.S. Cl.
CPC ........... *C09D 5/002* (2013.01); *C09D 129/14* (2013.01); *C09D 133/04* (2013.01); *C09D 163/00* (2013.01); *C09D 167/08* (2013.01); *C09D 175/04* (2013.01); *C09D 195/00* (2013.01); *D06N 3/0006* (2013.01); *D06N 3/042* (2013.01); *D06N 3/14* (2013.01); *D06N 3/183* (2013.01); *D06N 2201/042* (2013.01); *D06N 2209/128* (2013.01)

(58) Field of Classification Search
CPC .. C09D 195/00; C09D 163/00; C09D 107/02; C09D 109/04; C09D 109/08; C09D 109/10; C09D 175/04; C09D 133/04; D03D 15/527; Y10T 428/2835; B60J 3/002
USPC .................................................. 442/59–180
See application file for complete search history.

(56) References Cited

U.S. PATENT DOCUMENTS

| | | | | |
|---|---|---|---|---|
| 3,480,463 A | * | 11/1969 | David ..................... | C08F 20/34 442/89 |
| 5,190,997 A | | 3/1993 | Lindemann et al. | |
| 7,868,094 B2 | | 1/2011 | Han et al. | |
| 10,174,179 B2 | | 1/2019 | Lu | |
| 2007/0020476 A1 | * | 1/2007 | Kintzley ................ | B27N 3/002 428/537.1 |
| 2010/0120309 A1 | * | 5/2010 | Arnold ................ | D06M 15/576 442/67 |
| 2012/0132363 A1 | * | 5/2012 | Kato ..................... | D06M 23/10 156/324 |
| 2013/0035012 A1 | * | 2/2013 | Jung ..................... | D06N 3/183 442/93 |
| 2016/0115337 A1 | * | 4/2016 | Lu .......................... | C08K 3/04 428/424.4 |
| 2018/0051412 A1 | * | 2/2018 | Barik ..................... | C09D 5/14 |

OTHER PUBLICATIONS

Bledzki, A. K., S. Reihmane, J. Gassan, Properties and Modification Methods for Vegetable Fibers for Natural Fiber Composites, 1996, Journal of Applied Polymer Science, vol. 59, 1329-1336 (Year: 1996).*
Dhakal, Hom N., and Zhong Y. Zhang, Properties and Characterization of Natural Fiber-Reinforced Polymeric Composites, 2014, Green Composites from Natural Resources (Year: 2014).*
Dhakal, Hom Nath, and Zhong Zhang. "Properties and characterisation of natural fiber-reinforced polymeric composites." Green composites from natural resources. CRC Press Inc, 2013. (Year: 2014).*
Textile Yarns, Jan. 2010, Cotton Incorporated (Year: 2010).*
Bledzki, A. K., Sahmir Reihmane, and Julio Gassan. "Properties and modification methods for vegetable fibers for natural fiber composites." Journal of applied polymer science 59.8 (1996): 1329-1336. (Year: 1996).*
Loctite, How to get PVA glue out of clothes: from despair to wear (Year: 2022).*
Silver Bobbin, How to Get Glue Out of Clothes in 10 Easy Ways (Year: 2022).*

* cited by examiner

*Primary Examiner* — Matthew D Matzek
*Assistant Examiner* — Braelyn R Watson
(74) *Attorney, Agent, or Firm* — Vidas, Arrett & Steinkraus PA; Richard A. Arrett; Edwin E. Voigt, II

(57) ABSTRACT

A natural fabric or textile product is coated and protected with a waterproofing composition comprising a crosslinking polyvinyl acetate (XPVAc or x-PVAc) emulsion polymer or adhesive applied and cured as a first coating layer or a primer and a coating layer of acrylic, alkyd, asphalt, emulsion polymer isocyanate, epoxy, lacquer, latex, polyurethane, urethane, or vinyl ester coated over the cured crosslinking polyvinyl acetate as a second coating layer or a topcoat. The natural fabric product is fabricated by weaving, knitting or felting the fibers, yarns or threads of vegetable or plant fibers from cotton, sisal, kenaf, hemp, jute, flax, reed, sugarcane, ramie, henequen, raffia, nettle, milkweeds, palm, coir, grass, Spanish moss, New Zealand flax, kapok, sugarcane, bamboo, or wood, or those of the protein fibers from wool, silk, spider threads, sea silk, or the combination thereof.

18 Claims, No Drawings

DURABLE NATURAL FABRIC PRODUCTS

CROSS-REFERENCE TO RELATED APPLICATIONS

This application is a utility application claiming priority to the provisional application of No. U.S. 62/761,699 filed on Apr. 4, 2018, the disclosure and entire contents of which are incorporated herein by reference.

FEDERALLY SPONSORED RESEARCH

None.

SEQUENCE LISTING

None.

TECHNICAL FIELD

The invention relates to a novel method of improving the water resistance and durability of a natural fiber fabric or textile product in a natural environment.

BRIEF BACKGROUND

Natural fabric or textile products or materials normally include clothing, bags, baskets, tents, curtains, blinds, sheet, netting, mats, cushions, rugs, seats, carpets, furniture, screens, and the like. They are extensively used for agriculture, construction, landscaping, military, packaging, recreation, transportation, etc.

Since most of the natural fiber fabric or textile materials are hygroscopic, they easily absorb water and are subject to dimensional and shape changes. In a natural environment, they are also under the attack by fungi, molds, termites, ants, and other biodegrading agents during service and especially when they are wetted and thus reducing their performance and service life.

Attempts to use a crosslinking polyvinyl acetate as adhesive for biomaterial-based products have been made to improve their dimensional stability. For example, an interpenetrating polymer network (IPN) adhesive disclosed in U.S. Pat. No. 5,190,997 by Lindemann et al. was used as a fiber binder of fabrics, especially as fiber filler. In the same invention, the adhesive composition by Lindemann et al. had a unique feature of dual glass transition temperatures ($T_g$). Among it, a first monomer was a crosslinking polyvinyl acetate polymer with low $T_g$, while the second one was a polystyrene polymer with high $T_g$. Both then formed into an IPN polymer emulsion through chemical synthesis.

When such an adhesive composition was used as fiber filler of a nonwoven fabric, the large $T_g$ difference between crosslinking polyvinyl acetate and polystyrene resulted in a creeping issue due to temperature and humidity changes in an indoor and wet or an outdoor condition. Accordingly, Lindemann's IPN adhesive was generally at risk of easy peel off within a short exposure period to an adverse environment when used as a surface protective coating or paint of a fabric. On the other hand, the IPN adhesive used by Lindemann was relatively small in molecular weight before being crosslinked and cured. It can easily penetrate into the fibrils, fibers or yarns of a fabric, thus resulting in a discontinuous coating film on the exterior surfaces of a natural fabric. Therefore, the IPN adhesive would be generally unsatisfactory to seal the exterior surfaces of the fabric when used as a protective coating for the fabric.

In U.S. Pat. No. 7,868,094 by Han et al., a foamed crosslinking polyvinyl acetate adhesive was used to bond a wood composite material including plywood, chipboard, orientated strand board, particle board, high density fiberboard, hardboard and the like. Due to the foaming defect, this adhesive was unable to be used as a protective coating to seal the exterior surfaces of a wood or fabric-like material. Hence, the foamable crosslinking polyvinyl acetate adhesive cannot provide an effective water resistance to the coated fabric products because the adhesive cannot fully cover and seal the fabric material.

These and other difficulties of the above prior art have been overcome according to the present invention which provides value-added natural fabric or textile products with improved performance and durability.

SUMMARY OF THE INVENTION

For the invention, a natural fabric product is a fabric material woven by natural fibers from the natural sources selected from the group consisting of a fiber plant or crop, an animal, or an insect. The natural fabric product also includes an industrial textile product. The natural fibers are generally divided into vegetable or plant fibers and protein fibers. The former are mainly from a fiber plant or crop, while the latter are obtained from animals or insects or the plant protein fibers. The animal or insect protein fibers are sometimes called animal fibers. For the invention, the above vegetable and protein fibers are collectively called natural fibers. They are distinguishable from mineral fibers such as glass fibers, metallic fibers, and the like. Mineral fibers are inorganic but man-made fibers. For the invention, natural or naturally-based fibers are from the organic fibers which are harvested or obtained naturally. Hereby, the resultant fabric product is collectively called a natural fiber fabric product or a natural fiber-weaving fabric. For the invention, hence, a natural fabric or textile product herein means a natural or naturally-based fiber fabric, a natural fiber-weaving fabric product, a natural textile product, a natural fiber-based textile product, and the like.

A natural fabric or textile product is normally fabricated by weaving, knitting, or felting the fibers, yarns or threads of a fiber plant or crop, including cotton, sisal, kenaf, hemp, jute, flax, reed, sugarcane, ramie, henequen, palm, coir, milkweeds, nettles, grass, straws, bamboo, wood, etc. or the fibers from wool, silk, spider threads, sea silk, etc., or the combination thereof.

Most of the aforementioned vegetable or plant fibers may contain cellulose, lignin, hemicellulose and pectin as the main microstructural components. For the invention, a cellulose content of the vegetable or plant fibers from a fiber plant, a crop or a tree is in a range of about 20% to about 95%, about 30% to about 50%, or about 60% to about 80%.

Alternatively, a natural fabric or textile product may be made from a protein fiber. The most popular protein fibers include an animal fiber such as mohair, cashmere, alpaca, angora and a silk fiber from cocoon. Alternatively, camel and goat hair may be included. Alternatively, an insect-secreting fiber of spider threads and sea silk may also be included for the invention.

Alternatively, a natural fabric may be made from regenerated fibers. Some regenerated fibers originate from the plant or animal proteins such as corn, soy, milk, etc., while other regenerated fibers may be made from cellulose extracted from wood, bamboo or other plants. The regenerated fibers may include rayon, lyocell, soy fiber, and the like.

The regenerated cellulose fibers may also have other generic names like Tencel, acetate, modal, viscose, etc.

After being collected or harvested, most of the vegetable or protein fibers may need to be extracted or separated. After soil, powder, dust, and other impurity substances are removed from vegetable fibers, a dew-wetting or other similar wetting process may be conducted for further purification. Protein fibers may undergo some cleaning or washing procedures or steps to remove dirt or debris. All the natural fibers may be dried out into a moisture content of about 6% to about 15% before twisting or spinning into yarns.

Before fabrication, all natural fibers may be spun into yarns or threads before weaving or fabrication. In general, individual natural or regenerated fibers are normally drawn out to produce overlapped lengths and then twisted or spun to become a continuous length of yarn. They can be twisted into S-spun and Z-spun yarns, respectively. S-spun yarns have the angle of twist from the top left to the bottom right, while Z-spun yarns have the angle of twist from the right top to the left bottom. The yarns are normally packed in rolls or spindles.

A yarn can be further divided into single, two-ply, three-ply, and multiple-ply in ply structure. The plied fibers are usually stronger and more stable than single yarns. In addition, the ply thickness of a yarn can vary. Knitting yarns can be designated as two-ply, three-ply and the like. Double knitting is twice the thickness of four-ply, while chunky is twice the thickness of double knitting.

Finally, the fibers, threads or yarns are woven or knitted into a weave structure or pattern. Among this structure, the warps and wefts are normally intersected at a right angle in a natural fabric. Alternatively, they may form any other angles to each other at the intersections with a range of about 0° to about 180°, depending on the design requirement of a fabric. Alternatively, the warps or wefts may be formed as +15°/−15°, +30°/−30°, +45°/−45°, +60°/−60°, or +75°/−75° to the longitudinal axis of the natural fabric.

For a natural fabric or textile product, there are mainly three types of basic weaves, including plain weave, twill weave, and satin weave. A twill weave may be 2/1, 1/2, 2/2, 1/3, 3/1, etc. Alternatively, a natural fiber fabric may use other different weave structures, including basket weave, rib weave, waffle weave, compound weave, lace weave, crepe weave, loom controlled double weave, loom controlled pile weave, etc.

A natural fabric or textile product may be woven by a single and pure fiber. A piece of cloth or curtain may be woven with a pure cotton fiber. Alternatively, it may be fabricated with a mixture of various natural fibers. Cotton may be woven with flax, jute, hemp, lyocell or kenaf. Alternatively, hemp may be woven with jute, kenaf, sisal, rayon or flax. The mixing ratios of different natural fibers in a fabric may vary. These are just examples.

A novel waterproofing composition for the invention is applied on a natural fiber-based fabric and may consist of one to multiple coating layers. The first coating layer is a Type I or Type II crosslinking polyvinyl acetate adhesive (XPVAc or x-PVAc) which acts as a primer to seal at least one portion of exterior surfaces of the fabric product and is then cured. An additional layer of crosslinking polyvinyl acetate may be further applied as a topcoat or an exterior layer. Alternatively, the fabric is only coated with one layer of crosslinking polyvinyl acetate when used indoors or outdoors. Alternatively, a regular paint or coating like acrylic, alkyd, asphalt, epoxy, lacquer, emulsion polymer isocyanate, polyester, polyurethane, or vinyl ester may be applied over the cured crosslinking polyvinyl acetate as a second coating layer or a topcoat.

Alternatively, multiple layers of the above regular paints may be further applied on the cured crosslinking polyvinyl acetate primer. Hence, a natural fiber-based fabric is tightly sealed and prevented from the penetration of water, vapor, mist or moisture condensation, or other wetting issues. Moreover, introduction of crosslinking polyvinyl acetate as a surface protective coating significantly reduces the water absorption by a natural fabric, thereby improving its water resistance and durability in a natural environment during service.

For the invention, crosslinking polyvinyl acetate is not only an adhesive to a natural fabric or textile product when applied on the fabric and cured, but it also acts as a surface protective coating for the fabric. The crosslinking polyvinyl acetate at least consists of a polyvinyl acetate-based adhesive resin, a crosslinking agent, and a catalyst before being cured. In addition, crosslinking polyvinyl acetate is a Type I or Type II adhesive, depending on the applications of the resultant natural fabric or textile material. Moreover, the crosslinking polyvinyl acetate coating can be a primer or a topcoat of the fabric. The crosslinking polyvinyl acetate coating may have a solid content of about 15% to about 70% by weight, or about 25% to about 40% by weight, or about 45% to about 60% by weight, while it has a dry thickness of about 0.001 inch to about 0.050 inch after being coated and cured on the fabric.

It is preferred that a crosslinking polyvinyl acetate adhesive may be coated on a natural fabric by an adhesive or glue spreader. Alternatively, other suitable coating methods may include spray coating, brush coating, extrusion coating, impregnation soaking, dipping, curtain coating, etc. Alternatively, the crosslinking polyvinyl acetate can also be applied on the natural fabric by manual brushing or roller coating.

Prior to coating with crosslinking polyvinyl acetate, a natural fabric may be preheated until the fabric surface temperature reaches to about 80° F. to about 250° F. by passing through a heating unit or tunnel which is installed in a distance of about 0.5 inch to about 36 inches away from the uncoated fabric substrate. The heating sources may include electrical, microwave, steam, hot water, solar, oil heating, ceramic heating, and the like. Alternatively, the fabric may be not pre-heated. These are just examples.

Similarly, the fabric material coated with crosslinking polyvinyl acetate may be cured at the surface temperature of about 80° F. to about 250° F. by using a heating tunnel or facility which is installed in a distance of about 0.5 inch to about 36 inches away from the coated fabric substrate. Alternatively, the coated fabric may be cured without heating.

A natural fabric product may be pre-treated with a chemical preservative or biocide selected from the group of consisting of a copper-, chromium-, arsenic-, zinc-, tin-, or titanium-based compound or complex, a boron-, nitrogen-, sulfur-, chloride-, phosphate-, or silicate-based compound or complex, or the combination thereof. The preservative or biocide forms as a coating layer on the fabric product to improve the decay resistance to fungi, molds or mildews, termites, and ants. Moreover, a crosslinking polyvinyl acetate adhesive may be applied and cured over the preservative or biocide coating layer on the exterior surface of the fabric product to seal and fix the preservative or its active ingredients by bonding and chelating with the preservative.

For the invention, the crosslinking polyvinyl acetate protective coating is a Type II adhesive and at least about 175 psi in Fruehauf wet shear strength and applied as a topcoat when the coated fabric is used indoors. Alternatively, the cured crosslinking polyvinyl acetate coating may be further applied with one or multiple layers of a regular paint or coating including acrylic, alkyd, asphalt, epoxy, emulsion polymer isocyanate, lacquer, latex, polyester, polyurethane, urethane, etc. when the coated fabric is used indoors or in a semi-outdoor condition where the fabric material is partially shielded.

Alternatively, the crosslinking polyvinyl acetate coating applied as a top or exterior coat of the natural fabric is a Type I adhesive and has a minimum Fruehauf wet shear strength of 325 psi when the fabric is used in a semi-outdoor or outdoor environment.

Alternatively, the same crosslinking polyvinyl acetate coating with a minimum Fruehauf wet shear strength of 325 psi is further applied with one or multiple layers of a regular paint including acrylic, alkyd, asphalt, epoxy, emulsion polymer isocyanate, lacquer, latex, polyester, polyurethane, urethane, etc. when the coated fabric is used for semi-outdoor or outdoor exposure.

DETAILED DESCRIPTION OF THE INVENTION

A natural fabric product or a natural textile fabric is a fabric woven by natural or naturally-based fibers obtained or extracted from the sources selected from the group consisting of a fiber plant, a crop, an animal, or an insect. The natural fibers are usually divided into 1) vegetable or plant fibers which are extracted or separated from cotton, kenaf, hemp, jute, flax, sisal, henequen, reed, bamboo fibers, kapok, milkweeds, nettles, palm or coir (including raffia), pina, ramie, yucca, wood, etc., 2) animal fibers obtained from fleece, hair or fur of an animal such as sheep, lamb, goat, rabbits, camel, llama, etc., and 3) insect-secreting fibers such as silk, sea silk, and spider threads, etc. The last two groups can be collectively called the protein fibers. The natural fibers can be a mixture of the above groups or a combination thereof.

Most of the above vegetable or plant fibers come from a fiber plant or crop which is perennial. The fibers are normally separated or extracted from its fruits or seedpods (e.g., cotton and kapok), husk or coir (e.g., coconut), leaves (e.g., sisal, henequen, milkweeds and nettles), stems (e.g., ramie, flax, jute, hemp, bamboo and wood), or other parts. All these fibers usually come from different fiber plants or crops domestically or globally.

Some fibers are mainly collected from the phloem or bast surrounding the stem of the plants. Hence, they are called bast fibers (also known as stem, phloem, or skin fibers). The most popular bast fibers are kenaf, jute, hemp, and flax. In general, bast fibers are softer than the leaf fibers which are stiffer and more brittle. Some vegetable fibers can be used as textile fibers, including cotton, flax, hemp, jute and the like.

There are about four hundred varieties of hemp (also called industrial hemp) in the world. The hemp may include Abaca or Manila hemp (Philippines and Malaysia), central Russian hemp, Bowstring hemp (Africa), Canadian hemp, Deccan hemp, Indian hemp (North America), Mauritius hemp, southern or Mediterranean hemp, Sunn hemp (India and other Asia countries), water hemp, wild hemp, etc.

Palm or oil palm fibers (also called coir fibers) include coconut, palmetto, fan palms, raffia, etc. which provide palm or palm-like fibers from their coir, leaves or leaflets. In general, oil palm fibers are very ductile but are lower in tensile strength than most other plant fibers. The husk or coir fibers of coconut palms are sometimes classified as fruit fibers, but coconut palms are also known with high oil content and yield of the endosperm (copra). Coconut coir is usually brittle with a diameter of about 0.1 mm to about 1.5 mm.

Jute is from the basswood family and the second most important vegetable fiber after cotton in the world due to its versatility. There are about forty species of jute growing worldwide, including white jute (*Corchorus capsularis*), red jute, Tossa jute (*Corchorus olitorius*), yellow jute, etc. Among these species, white jute and Tossa jute (also knowns as jute marrow or nalta jute) are by far the two most important jute fibers.

Flax is a popular fiber plant cultivated in cooler regions of the world. It is also called common flax or linseed. For the invention, flax means the unspun fibers of a flax plant, which can be made as textile products such as bed sheets, undergarments, tablecloths, and so on. The fabrics are normally known as linen in the western countries.

Kenaf comes from the stem fibers and are very similar to jute. Its family also includes other species such as roselle, aramina, cadillo, China jute, okra, and cotton plant.

New Zealand flax is not flax at all although it has the same name of flax. Unlike regular flax, the fibers of New Zealand flax are extracted from the leaves instead of the stems.

Pina (sometimes also known as nanas or nenas) is the leaves of a pineapple plant which yield for fibers. Pina fibers are mostly produced in Hawaii, Philippine, and some Latin American countries. Pina fibers are very hygroscopic, but have superior mechanical properties due to their high cellulose content and small microfibrillar angle. In addition, pina fibers compete with jute in flexural and torsional rigidity.

Spanish moss is an epiphytic flowering plant and often grows upon large trees in tropical or subtropical climates. The stems and leaves are covered with overlapping scales for absorbing water and trapping dust and nutrient particles. The fibers of a Spanish moss plant can be woven into cloth, car seats, bedding, mattress stuffing, floor mats, etc.

Some fiber plants, including milkweeds and nettles, are a perennial weed. Milkweeds may include common milkweed, swamp milkweed, showy milkweed, and butterfly weed, while nettles include wood nettle and stingless nettle. Milkweeds and nettles are not planted so extensively as cotton, jute, kenaf, hemp and sisal. Like cotton, the nettle fiber has a high tensile strength and a remarkable fineness due to its high cellulose content.

Silk and wool are different from the above vegetable fibers. Silk is a natural protein fiber from the cocoon of larvae secreted by a silkworm, while wool is a natural protein fiber from the fleece of sheep or lambs. Other protein fibers may be from the fur or hair of goats, alpaca, llama, camel, rabbits, etc. Silk, wool, and other protein fibers can be spun and woven into a fabric material as easily as the aforementioned vegetable fibers.

Among all natural fibers, cotton is not only the most pure cellulose fiber source and but also has the least cost for harvesting. Cotton is the number one of natural fibers for yield and application among all natural-based fibers. In general, cotton fibers are directly collected from the seedpods of a cotton plant. The collected fibers are dried to reduce their moisture content. A seed removing equip is then used to separate the cotton fibers from a number of seeds. The cotton fibers may be further cleaned through passing several seed removing machines. The pure and clean cotton fibers are dried into a moisture content of about 6 to 15% and finally packed in bundles prior to shipping to a textile factory. Similarly, most of the protein fibers may be as easily harvested as cotton fibers.

However, flax, jute, hemp and other natural fibers may require more effort and labor to be extracted or separated from the fiber plants than cotton. In addition to separation of the seed from flax, jute, or hemp fibers during extraction, these plant fibers need to go through a retting process, in which the fiber plants (most of the bast or stem sections) are wetted by water or moisture to loosen off the bonding connections between or among the fibers in the stem sections and leach out the sugar compounds of pectin or hemicellulose. During retting, fungus and bacteria accelerate the decomposion of these sugar compounds to release the strands of fibers from the inner core and outer skin of a stem.

For flax stems or bundles, a dew-retting or water retting process can be used to separate the fibers from the plant stem. In the former process, flax bundles are dew-retted by spreading them on grassy lawn to absorb the nightly dew, while for the latter, flax bundles are soaked in water by submerging them in a water pond, flowing stream, or large tank or tub. The dew-retting process usually takes three to five weeks to separate the fiber materials from the stem, while the water retting process needs only four to twelve days, depending on the water temperature.

After retting, the fiber bundles are air-/oven-dried to about 6% to about 15% in moisture content, depending on the product requirements. The dried fiber bundles then pass through breaking, scutching, hackling, and the like to clean and get rid of short fibers, seeds, chives, chaff, straw or other small substances from the fibers. After that, the cleaned flax fibers can be packaged to ship to a yarn shop or a textile factory. Jute, hemp and other bast fibers can also undergo the retting processes very similar to the flax fibers.

Alternatively, other different fiber separation methods may be applied for some short and slim fibers from a fiber plant or crop like wood, bamboo, reed, corn stalks, cotton stalks, sugarcane, or grass. One common approach is the mechanical pulping process. Firstly, wood, bamboo or reed is ground into pulps under heat by a stone grinder, a refiner grinder, a double disk refiner, or other suitable facilities. Similarly, fiber separation can also be conducted by chemical pulping, semichemical pulping, biological pulping and other suitable methods. The formed fibers or pulps pass through a series of screens to remove fines and powder. Finally, the fibers are dried to reduce the moisture content to between about 6% to about 15%. These fiber separation methods may be also suitable for other vegetable fibers.

Canvas is a popular natural fiber fabric, which is normally made from cotton or linen although it was historically made from hemp. It is usually a plain-woven fabric and more durable than regular cotton or linen fabrics. Canvas can be further specified as cotton canvas and linen canvas. Canvas can also be divided into plain and duck. The duck canvas is different from the plain canvas because the threads of the former are more tightly woven than the latter. Canvas can be fabricated into many fabric products, including sails, tents, marquees, covering layers, backpacks, painting surfaces including oil painting, canvas canoes, handbags, electronic devices, shoes, etc. These are just examples.

A natural fabric can be woven with a single fiber. For example, a piece of cloth or curtain can be woven with cotton fiber. Alternatively, it can be fabricated with a mixture of natural fibers. For instance, cotton may be woven with flax, jute, hemp, lyocell, or kenaf. Or, hemp may be woven with jute, kenaf, sisal, rayon, or flax. The mixing ratios of different natural fibers in a fabric may vary. These are just examples.

Most of the fabric fibers in the aforementioned fiber plants or crops contain cellulose, lignin, hemicellulose and pectin as the main microstructural components. As an important structural component of the primary cell wall in a fiber plant or crop, cellulose is a polysaccharide. It has a long chain of D-glucose building blocks which are joined end to end with $\beta(1-4)$ glycosidic links. Cellulose chains can be either loosely arranged or densely packed into a crystalline structure. In general, parallel bundles of cellulose molecules form tiny fibrils. The fibrils are laid down in successive layers to form the cell walls of fibers. Each layer of fibrils may form a spiral structure inside the cell wall. Cellulose normally provides strength to a fiber plant.

Lignin is accumulated between the strands of cellulose in cell walls to provide rigidity and stiffness to plant stems. For vegetable fibers, hemicellulose acts like a glue to bond cells together into fiber bundles or blocks and binds the different layers of the plant stems together, while pectin is a structural heteropolysaccharide and abundant in the middle lamella of a fiber plant. Pectin helps bind the cells together, but may also exist in the primary cell walls.

In general, most of the vegetable fibers used in the market are not completely pure in cellulose. They may contain a few of lignin, hemicellulose or other substances although most of these non-cellulose substances are removed during the fiber separation process from the plants. For example, cellulose in hemp and flax fibers accounts for about 70%; cotton, about 85% to about 90%; ramie, about 70%; cereal straw, about 40%; and coir, about 30% to about 40%. For the invention, a cellulose content of the vegetable fibers from a fiber plant, a crop or a tree is in a range of about 15% to about 95%, about 20% to about 30%, about 35% to about 45%, 50% to about 60%, or about 65% to about 75%, about 80% to about 90%. These are just examples.

The purity of cellulose may significantly influence the strength and flexibility of a fabric product. For example, a fabric from cotton which has the highest purity of cellulose is more flexible than that from hemp with lower cellulose content. Similarly, a sisal fabric is stronger in tensile strength than a coir-based one.

Since most of the vegetable fibers consist of cellulose and lignin in composition, they are hygroscopic in nature. These lignocellulose materials absorb water and moisture due to the existence of abundant hydroxyl groups in the chemical structure of cellulose and lignin. Although the protein-based natural fibers do not contain cellulose, lignin, hemicellulose and pectin like vegetable fibers, their composition elements also absorb water or moisture in a natural environment. Generally, a natural fabric product easily absorbs water and moisture. Hence, it is subject to the attack by fungi, insects, molds or mildews, and other biodegrading agents, and thus reducing its service life.

As aforementioned, some natural fabric products made from vegetable fibers may also contain hemicellulose due to that it cannot be completely removed during the fiber extraction process. Hemicellulose is the least durable component compared with cellulose and lignin under the natural environment because it has more sugar compounds than cellulose and lignin. It easily absorbs moisture and water and is easily subject to the attack of fungi, insects, molds or mildews, etc. even in a dry status. Hence, a natural fabric product with more hemicellulose has a durability issue compared with that with less or little hemicellulose.

A natural fiber fabric includes natural fiber-based textile products such as clothing, mats, bags, sheets, tents, mats, nets, cushions, towels, carpets or rugs, furniture, sacks, slippers, and the like. The above textile products are automatically or manually fabricated with natural fibers by a weaving machine like an industrial loom or a similar facility. As aforementioned, the natural fibers may include cotton, kapok, flax, hemp, jute, sisal, ramie, bamboo, New Zealand flax, pina, raffia, sugarcane, wool, silk, etc. These are just examples. Alternatively, a fabric can be woven manually.

Cotton is a soft, short and fine staple with an average length of one inch, while kapok is much shorter and silkier than cotton. Kapok is usually used for stuffing.

Bast fibers normally come from the woody stems or stalks of a fiber plant or crop. Hemp and linen fabricated by the fibers of flax are strong and smooth, but both easily absorb moisture and dry quickly. Jute is coarse and not very strong and may be deteriorated with moisture. Ramie is strong and reasonably fine. Bamboo fiber is short in length and easily absorbs moisture. These are just examples.

For leaf fibers, New Zealand flax varies in length and luster with species or type. Raffia is coarse and stiff, while pina is filmy and shiny.

For the invention, wool is one of the most popular animal fibers and has a variation in breeds, fiber lengths, and qualities. For example, some fibers are long, others, short; some fibers are straight; while others, curly or crimped. In general, the shorter staples are usually finer fibers with a crimp feature. The same are the other animal fibers.

Some well-known animal fibers include the following special staples such as mohair from the Angora goat, cashmere from the Cashmere or Tibetan goats, alpaca from Peruvian camelid, angora from the Angora breed of rabbit, and silk from cocoon. Camel and goat hair may be also included. All these fibers can be coarse or fine, hard or soft, and short or long. Mohair is a strong fiber and about ten inches in length, while alpaca is highly lustrous with little crimp. The camel fibers have a high wear resistance. These are just examples.

Alternatively, a natural fabric may be made from regenerated fibers (also known as semi-natural fibers). Some regenerated fibers originate from plant or animal proteins, such as corn, soy, peanut, and milk, while other regenerated fibers are made from cellulose extracted from wood, bamboo or other plants. For instance, rayon and lyocell need to be generated from cellulose and reduced into a viscous pulp before spinning, while soy fiber comes from soybean pulp after oil has been extracted. The above regenerated cellulose fibers may also have other generic names like Tencel, acetate, modal, viscose, etc. These are just examples.

In general, most of the vegetable fibers need to be extracted from the fiber plants, whereas some natural fibers like cotton are harvested directly from the plants manually or by a special machine. Some natural fibers need to be soaked for separation or extraction of the fibers from the plant stem or leaves. Most of the animal fibers like wool may be free of the extraction. However, most of the collected natural fibers usually need a cleaning process to comb out or remove the impure substances existing in the fibers. For example, natural fibers are required to pass a washing or laundry step in order to remove dirt, debris, soil and other impure substances and are then air-/oven-dried before spinning.

As one of the important steps of making a textile fabric, all natural fibers need to be spun into a yarn or thread before weaving into a fabric product. In general, non-continuous fibers are linked together to form into a continuous string or wire with the fiber ends being buried in the formed yarn or thread. That is, the individual fibers are drawn out to produce overlapped lengths and then twisted or spun to become a continuous length of yarn or thread. Individual fibers can be twisted with two different directions of S-spun and Z-spun. S-spun yarns have the angle of twist from the top left to the bottom right, while Z-spun yarns have the angle of twist from the right top to the left bottom. The yarns are normally packed in rolls or spindles. They are stored in a dry and cool environment.

In some embodiments, different fibers can be blended to form a mixed yarn or thread. For example, an expensive fiber can be blended with a cheap fiber to reduce the cost of the resultant yarn. A mixed fiber would have little influence on the nature of a hybrid yarn as long as it is less than 10% by weight in the blend.

In some other embodiments, the weaving structure of a natural fabric can consist of a warp yarn and a weft yarn. By definition, a warp yarn is normally strong and firm, while a weft yarn is usually weak in the fabric, so it can be different from warp or anything else. Alternatively, the warp or weft can be of the same fibers or yarns, depending the product design and application.

According to the ply structure, a yarn can be divided into single, two-ply, three-ply, or multiple-ply. The plied fibers are usually stronger and more stable than single yarns. For a plied yarn, a single yarn is twisted in an opposite direction to an adjacent single in order to reduce the stress built among or within individual single yarns. On the other hand, the ply thickness of a yarn can vary. Knitting yarns can be designated as two-ply, three-ply and the like. Double Knitting is twice the thickness of four ply, while Chunky is twice the thickness of Double Knitting.

For a natural fabric product, there are mainly three types of basic weave patterns. Plain weave (also known as tabby weave) is the most popular weave structure and accounts for about 80% of all commercial fabrics by estimation. In a plain weave structure, each warp end is intersected by a weft pick, such that the warp ends should be equal to the weft picks. Twill is also popular for a natural fabric. A fabric with a twill draft normally has the feature of diagonal lines in the draft. The twill may have a floating feature in which a warp end or a weft pick passes over or under two or more consecutive threads in the fabric. There may be 2/1, 1/2, 2/2, 1/3, 3/1 or other twills. Satin weave is similar to irregular twills in weave structure. A fabric with the satin weave is usually arranged to avoid the diagonal lines.

In some situations, a natural fiber fabric may also include other weave structures such as basket weave, rib weave, waffle weave, compound weave, lace weave, crepe weave, loom controlled double weave, loom controlled pile weave, etc. These are just examples.

In general, the warps and wefts are vertically or perpendicularly intersected in a fabric, but they can form any other angles to each other at the intersections with a range of about 0° to about 180°, depending on the design requirement of a fabric. Moreover, the warps or wefts can form a certain angle to one of the axes of a natural fabric. For example, both can be formed as +15°/−15°, +30°/−30°, +45°/−45°, +60°/−60°, or +75°/−75° to the longitudinal axis of the natural fabric. These are just examples.

Except for use for a large scale of industrial production, a natural fiber is also suitable for hand or manual weaving because it has a relatively coarse size and provides tactile satisfaction compared with the man-made or synthetic counterparts.

In some other situations, the wefts or warps are used as the same, but they may be fabricated or knitted by a special machine into a nonwoven fabric in which the fibers are randomly tangled together like spaghetti. The fibers or yarns in the nonwoven fabric can be continuous or non-continuous. Compared to a woven fabric, the nonwoven fabric is more loose and softer. Moreover, it is weaker in tensile strength and cheaper in cost.

A natural fabric is usually bleached after fabrication. The bleached fabric is further dyed with different colors. Alternatively, the fibers or yarns can be firstly bleached and then dyed with a designed color, finally knitted into a textile or weave fabric. Both dying methods are extensively used in the textile industry.

All fabric materials with the natural fibers may be dyed into different colors. For example, a fabric can be black, white, red, green, blue, and so on. However, dying fibers may take time and labor. Before dying, the fabric material is normally treated with a strong oxidizing agent such as chlorine-based chemicals or hydrogen peroxide to provide a pure and even background. Some fibers may be difficult to dye and need to pass several pretreating processes before the dying step. A special dye formula or material may need to be used for different fibers. Thus, dying fibers may increase the cost of a fabric material.

For the invention, a natural fabric is preferred to be free of dying because the plain fabric may help promote the bonding performance of a material with a surface coating or an adhesive without the interference of the dye or pigment at the fiber surface. The final color can be provided by the coating or the adhesive. The color of a final fabric product can be black, white, red, green, blue, and the like, depending on the product design and the customer's requirement.

For the invention, a fabric is preferably plain without bleaching, dying or either. There may be some advantages of using a plain fabric for the invention: 1) reducing the processing steps, 2) avoiding the bleaching and dying agents or chemicals. Both are possibly a pollutant to the natural environment. Some of these chemicals are even harmful to human beings; 3) providing a better adhesion between a coating and the plain fibers; and 4) more importantly, reducing the cost and labor caused by the bleaching and dying processes.

A natural fiber fabric usually has a two-dimensional (2D) and planar structure in which the thickness is much less than the width and length. The cloth made by cotton or other fibers can be over 10 ft. in dimension, while its thickness is in the range of about 0.002 inch to about 0.250 inch, about 0.005 inch to about 0.025 inch, about 0.030 inch to about 0.050 inch, about 0.070 inch to about 0.100 inch, about 0.125 inch to about 0.150 inch, about 0.175 inch to about 0.200 inch, about 0.210 to about 0.240 inch. These are just examples.

Since most of the fiber fabrics are normally formed into a weft and warp-intersected structure, the wefts and warps are intersected or tangled together without additional fastening or fixing. A fabric is normally kept in shape mainly through the mechanical tightening up of yarns or threads with intersecting weave or knitting, but the yarns can shift or move to one another. Hence, the shape or dimension of a natural fabric may be changeable during service.

In some other situations when a high resistance to biodeterioration is required, a natural fiber fabric may be pre-treated with a preservative or biocide to improve its resistance to fungi, termite, ants, and other biodegrading agents. The fabric preservative can be copper-, chromium-, arsenic-, zinc-, tin-, or titanium-based compound or complex, a boron-, nitrogen-, sulfur-, chloride-, phosphate-, or silicate-based compound or complex, or the combination thereof.

A preservative or biocide used for treating a natural fabric may include acid copper chromate, amine copper, ammoniacal copper citrate, ammoniacal copper acetate, ammoniacal copper arsenate, ammoniacal copper borate, ammoniacal copper carbonate, ammoniacal or alkaline copper quaternary (including Type B and Type D), ammoniacal copper sulfate, ammoniacal copper zinc arsenate, chromated zinc chloride, etc. These are just examples.

Alternatively, a preservative, biocide, or antimicrobial for treating a natural fabric may include some chemical compounds or complexes less toxic or low hazard to human health or the natural environment, including copper sulfate, zinc sulfate, zinc chloride, sodium sorbate, potassium sorbate, 2-bromo-2-nitropropane-1,3-diol (bromopol), boric acid, sodium borate, chlorine dioxide, triclosan, sodium dichloroisocyanurate, vegetable glycerin, phenoxyethanol, ethylhexylglycerin, propylene glycol, etc. These are just examples.

A water-borne preservative is preferred because it does not interfere with the bonding of a coating or an adhesive with the preservative-treated fabric. However, some water-insoluble or oil-based preservative can be converted into a water dispersible or emulsion system by using water dispersible co-solvents, cationic or anionic emulsifiers, alcohols, glycols, esters, other dispersing agents, adhesives, etc. These are just examples. The preservatives can cover the exterior surfaces of the natural fabric and form a surface coating layer on it. They can also penetrate into the fabric and form a coating layer across the whole thickness of the fabric.

For the invention, a crosslinking polyvinyl acetate emulsion polymer or adhesive is used as a protective coating in order to improve the water resistance and durability of a natural fabric product. Crosslinking polyvinyl acetate is a water-based adhesive. It may consist of a polyvinyl acetate-based adhesive resin, a catalyst, a crosslinking agent, a pigment, a surfactant, a biocide, a coalescent agent, etc. The polyvinyl acetate adhesive resin may also include a copolymer of polyvinyl alcohol (PVA), ethylene vinyl acetate (EVA), or others. The examples for these additives of crosslinking polyvinyl acetate have been already described in details in U.S. Pat. No. 10,174,179.

A suitable crosslinking agent for crosslinking polyvinyl acetate is normally a bi-functional compound, which may include acrylic acid (AA), oxalic acid, glyoxal, dialdehyde glyoxal, glutaraldehyde, acrylonitrile (AN), n-butyl acrylate (BA), vinyl butyrate (VB), vinyl chloride, acetoacetoxy ether methacrylate (AAEM), diacetone acrylamide, 4-hydroxybutyl acrylate, 4-hydroxybutyl acrylate glycidylether, hexakis-(methoxymethyl)-melamine (HMMM), isopropylene alcohol, 2-hydroxyethyl acrylate, glycidyl methacrylate, methyl methacrylate (MMA), N-isobutylmethylol acrylamide (NIBMA), N-methylol acrylamide (NMA), natural rubber latex, versate acid Veo Va-9 or VV 9 ($CH_2$=$CHOOCCR_3R_1R_2$) and Veo Va-10 or VV10, and the like. These are just examples.

Alternatively, suitable crosslinking agents may also be a mixture of vinyl acetate (VAc) with the above crosslinking agents to form a copolymer such as VAc/BA, VAc/MMA, VAc/AAEM, VAc/NIBMA, VAc/NMA, VAc/Veo Va-9, VAc/Veo Va-10, VAc/AA/AN, and the like. These are just examples.

Alternatively, other possible crosslinking agents with a similar structure may be the products of vinyl acetate and other monomers, including VAc/ethylene, VAc/2-ethylhexyl acrylate, VAc/polyethylene glycol dimethacrylate, and the like. The resultant crosslinking agents can help improve the water resistance of crosslinking polyvinyl acetate.

Alternatively, suitable crosslinking agents may also include butyl and methyl acrylate esters for the vinyl acetate/butyl acrylate monomer. They may be the copolymers of vinyl ester and VeoVa-10, including VeoVa-10/methyl methacrylate and VeoVa-10/methyl methacrylate/2-ethylhexylacrylate.

The catalyst of crosslinking polyvinyl acetate adhesive or coating may include: 1) Metal ion compounds, including chromium nitrate, aluminum nitrate, aluminum chloride, antimony trichloride, iron trichloride, zirconium nitrate, potassium dichromate, chromic perchlorate, calcium chloride, sodium persulfate, potassium persulfate, basic zirconium oxychloride, bismuth oxychloride, vanadium oxychloride, etc.; 2) Nonmetallic chemicals, including ammonium persulfate, hydrogen peroxide, oxalic acid, tertbutyl persulfate, etc.; and 3) The combination of these compounds.

In some embodiments, a coalescent is also added into the crosslinking polyvinyl acetate adhesive emulsion or coating. The coalescent not only provides a high level of the film integrity, but also enhances the performance of the crosslinking polyvinyl acetate coating, including low temperature coalescence, touch-up, scrub resistance, washability, color development, thermal flexibility, and resistance to mudcracking. A coalescent for crosslinking polyvinyl acetate may include an ester alcohol of 2,2,4-trimethyl-1,3-pentanediol monoisobutyrate, dipropylene glycol dimethyl ether, velate 368, Dowanol DPnB, etc.

Although crosslinking polyvinyl acetate has been used as an adhesive for the wood industry, it was the first time introduced as a protecting coating for a wood or wood composite product in the prior art of U.S. Pat. No. 10,174,179. Of course, most of the fundamental principles for the crosslinking polyvinyl acetate coating used for wood materials in U.S. Pat. No. 10,174,179 can also apply to a natural fabric product.

Likewise, a crosslinking polyvinyl acetate adhesive when used as the coating material of a natural fabric has the following features: 1) although its one adherent phase bonds to the substrate (which is necessary for a coating), the resin must form a free and continuous film on the substrate of a fabric with the other adherent phase without bonding, 2) this film only seals the exterior surface of the substrate, and 3) this film must be exposed to the natural atmosphere through its nonbonding phase to work as a surface protective layer for the substrate.

According to the above principles, however, a crosslinking polyvinyl acetate adhesive should not have a foam structure which may form a non-continuous film on the fabric substrate, thus resulting in poor water resistance of the coated fabric. In addition, the copolymers or the crosslinking sections of a crosslinking polyvinyl acetate emulsion polymer should have a close glass transition temperature to avoid breaking, cracking or peel off of the resultant coating film applied on a natural fabric under a temperature or humidity change.

For the invention, a crosslinking polyvinyl acetate emulsion polymer is coated as the first coating layer on a natural fabric product in order to maintain a durable performance. This new coating system may include the following coating layer structures: 1) The crosslinking polyvinyl acetate is used as the first coating layer to seal the natural fabric product; 2) The second coating layer of crosslinking polyvinyl acetate is then applied over the first coating layer of the cured crosslinking polyvinyl acetate; 3) Alternatively, the crosslinking polyvinyl acetate is used as primer, while the second coating layer (or the exterior layer) is acrylic; 4) Alternatively, alkyd is used as the second coating layer over the cured crosslinking polyvinyl acetate primer; 5) Alternatively, an epoxy coating is used as the second coating layer to cover the first coating layer of crosslinking polyvinyl acetate; and 6) Alternatively, other water resistant coatings or paints such as asphalt, lacquer, urethane, polyurethane; emulsion polymer isocyanate (EPI), and the like may be applied as a top coating layer on the cured crosslinking polyvinyl acetate. The first two coating layer structures are known as a pure coating structure, while the last four are called a hybrid coating composition.

For the invention, the Fruehauf wet shear strength concept was derived from U.S. Pat. No. 10,174,179. According to Table 1 and the inventor's experimental data, three wet shear strength categories for Type I and II crosslinking polyvinyl acetate adhesives have been established in U.S. Pat. No. 10,174,179 as 278±104.4 psi, 405±93.6 psi, and 724±43.6 psi, respectively. Although the above standard deviation for each wet shear strength category was not reported in U.S. Pat. No. 10,174,179 at that time, it can be calculated from the original data set.

TABLE 1

Bonding performances of different crosslinking polyvinyl acetate adhesives

| Adhesive sample | Adhesive type | Sample quantity | Nominal width (in) | Nominal length (in) | Wet shear strength (psi) |
|---|---|---|---|---|---|
| Titebond II | Type II | 15 | 1.44 | 2 | 278 |
| Titebond III | Type I | 15 | 1.44 | 2 | 405 |
| XB-90MI | Type I | 15 | 1.44 | 2 | 422 |
| Deckbond LS | Type I | 15 | 1.44 | 2 | 818 |
| Deckbond LS coating | Type I | 15 | 1.44 | 2 | 724 |

Northern red oak strips were used for the above shear test blocks. Deckbond LS coating is the formula in which carbon black is added as colorant in the adhesive (Also see Table 1 in U.S. Pat. No. 10,174,179).

According to the definition by the wood adhesive industry, Type I (or Type 1), Type II (or Type 2), and Type III (or Type 3) adhesives are the categories for the adhesives used to bond wood. ASTM D 4317 has further classified them into that Type I polyvinyl acetate-based adhesives are for wet use, Type II, intermediate use; while Type III, recommended for dry use only. Since ASTM D 4317 is not so robust as the Fruehauf industry standard as mentioned in U.S. Pat. No. 10,174,179, a Fruehauf wet shear strength is combined with ASTM D 4317 for the invention.

According to the above first wet shear strength category of 278±104.4 psi, a crosslinking polyvinyl acetate protective coating needs to be a Type II adhesive and has a minimum Fruehauf wet shear strength of 175 psi when it is used as a topcoat of a natural fabric in an indoor condition. Alternatively, the cured crosslinking polyvinyl acetate coating can be further coated with one or more layers of a regular water resistant coating such as acrylic, alkyd, asphalt, epoxy, lacquer, latex, emulsion polymer isocyanate, polyester, polyurethane, urethane, etc. when the coated fabric is used in an indoor or a semi-outdoor condition where the fabric material is partially shielded.

Alternatively, the crosslinking polyvinyl acetate coating applied as a top or exterior coat for the coated natural fabric is a Type I adhesive and at least about 325 psi in Fruehauf wet shear strength, corresponding to the second wet shear strength category of 405±93.6 psi. The coated natural fabric material is suitable to be used in a semi-outdoor or outdoor condition.

Alternatively, the cured crosslinking polyvinyl acetate adhesive with a minimum Fruehauf wet shear strength of 325 psi is further coated with one or more layers of a regular coating including acrylic, alkyd, asphalt, epoxy, lacquer, latex, emulsion polymer isocyanate, polyester, polyurethane, urethane, vinyl ester, etc. when the coated natural fabric is used in an outdoor condition.

The curing of crosslinking polyvinyl acetate is driven by a loss of moisture in the emulsion and/or when the moisture is dried out.

For the invention, a crosslinking polyvinyl acetate adhesive has two functions: It is an adhesive material and also a surface coating to seal and protect the natural fabric product. As a coating material, the crosslinking polyvinyl acetate not only has excellent adhesion with a natural fabric, but it also provides excellent water and UV light resistances to the natural fabric product.

In some other embodiments, the crosslinking polyvinyl acetate may be mixed with other adhesives selected from the group consisting of phenol formaldehyde (PF), urea formaldehyde (UF), melamine formaldehyde (MF), melamine urea formaldehyde (MUF), emulsion polymer isocyanate (EPI) and the like and used as a coating material for a natural fabric product. The mixing ratio of the crosslinking polyvinyl acetate can vary from about 5% by weight to about 90% by weight, or from about 10% by weight to about 25% by weight, from about 30% by weight to about 45% by weight, from about 50% by weight to about 65% by weight, or from about 70% by weight to about 85% by weight. These are just examples.

Prior to the surface coating treatment, a natural fabric product may be air-, kiln-, or oven-dried for a certain period to reach a moisture content of less than 20%, preferably about 6 to about 15%. The dried natural fabric products are then coated with a crosslinking polyvinyl acetate emulsion adhesive as primer and a regular paint as the second coating layer.

The crosslinking polyvinyl acetate emulsion polymer can be a two-part or one-part adhesive. For the two-part crosslinking polyvinyl acetate adhesive, the adhesive emulsion and catalyst are usually separately packaged and only mixed together before being applied to a substrate, while the catalyst is already pre-mixed in the adhesive emulsion for the one-part crosslinking polyvinyl acetate adhesive which is ready for use. In general, a two-part crosslinking polyvinyl acetate adhesive has longer shelf life than a one-part crosslinking polyvinyl acetate adhesive. Moreover, the former is better in water resistance than the latter.

In at least some embodiments, crosslinking polyvinyl acetate can be divided into a Type I or Type II adhesive based on its performance and durability. A Type I crosslinking polyvinyl acetate adhesive is better in water resistance and used in an exterior atmosphere, but it is not waterproof, while a type II crosslinking polyvinyl acetate adhesive can withstand water contact for a short time but would maintain its bonding performance in room conditions. However, a Type II crosslinking polyvinyl acetate adhesive should not be directly used in outdoor conditions.

For the aforementioned coating layer structures, two coating layers are usually applied on the natural fabric products, while multiple coats may be further applied on the natural fabric products. Alternatively, only one coat of crosslinking polyvinyl acetate may be applied on the fabric surface, depending on the product application requirements.

In some situations, two layers of a crosslinking polyvinyl acetate emulsion adhesive or coating can be firstly applied on the fabric surface as primer, and then the third or multiple layers of a regular water resistant paint or coating like acrylic, alkyd, or latex can be added when a high water resistant fabric product is required.

In some situations, a crosslinking polyvinyl acetate coating or adhesive has a solid content of about 15% to about 70% by weight, about 25% to about 40% by weight, or about 45% to about 60% by weight. These are just examples.

In some other situations, a crosslinking polyvinyl acetate adhesive is between about 0.001 inch to about 0.050 inch in dry thickness, about 0.005 inch to about 0.015 inch, about 0.020 inch to about 0.030 inch, or about 0.035 to about 0.045 inch after being coated and cured on a natural fabric. The total dry coating thickness of a natural fabric product may be in a range between about 0.007 inch and about 0.100 inch.

Before a natural fabric is coated with crosslinking polyvinyl acetate, it can be pre-heated by passing a heating unit or tunnel. Pre-heating the fabric before applying a crosslinking polyvinyl acetate adhesive may provide better wetting to the fabric by the crosslinking polyvinyl acetate adhesive, and thus improving the adhesion with the microstructural components of vegetable or protein fibers (e.g., lignin, cellulose, hemicellulose, etc.) of the fabric. This may include exposing the fabric to a heating apparatus.

In at least some situations, a heating apparatus may be an infrared (IR) heater. The set temperature of the IR heater may be in a range of about 400° F. to about 1500° F. (e.g., the heating head of a heating apparatus may have a heating density of about 10 $W/in^2$ to about 1,000 $W/in^2$). This is just an example.

While preheating, a heating zone may be defined by placing a heating apparatus adjacent to the fabric. For example, a heating apparatus (e.g., a heating head thereof) may be disposed approximately 0.5 inch to 36 inches (e.g., about 0.5 inch to about 10 inches, or about 12 inches to about 20 inches, or about 22 inches to about 32 inches) away from the fabric surface and define the heating zone in between. Alternatively, the heating unit or device may also contact the natural fabric. The alternative heating energy may include electrical, microwave, steam, hot water, solar, oil heating, ceramic heating, and the like. These are just examples.

In some cases, the preheating process may be a continuous process where a coated fiber fabric passes a heating apparatus with, for example, a conveyor or other supporting device. A fabric material may be preheated so that the fabric surface temperature reaches about 80° F. to about 250° F., or about 80° F. to about 180° F., or about 130° F. to about 160° F. Preheating may occur over a suitable amount of time, which may be, for example, about 2 seconds to 10 minutes or so (e.g., 1 second to 5 minutes or so) for the coated fabric to pass through the heating apparatus, depending on the heating density used. However, preheating may not be required.

For the invention, a crosslinking polyvinyl acetate adhesive may be coated on a natural fabric with an adhesive or glue spreader or a roller coating machine. The adhesive spreader is usually furbished with two to four roller coaters, depending on the design and production requirements. Alternatively, the adhesive spreader may be substituted with a spray coating, brush coating, impregnation soaking, extrusion coating, or curtain coating machine to apply the crosslinking polyvinyl acetate coating to the fabric substrate. These coating facilities may be also suitable for further applying a regular paint selected from the group consisting of acrylic, alkyd, asphalt, lacquer, latex, polyurethane, emulsion polymer isocyanate, urethane, vinyl ester, etc. as a second coating layer or a topcoat over the cured crosslinking polyvinyl acetate coating on the fabric product. These are just examples.

By following the application of a crosslinking polyvinyl acetate coating, a coated fabric may be again heated within another heating zone/tunnel with a suitable heating apparatus, similar to the aforementioned preheating process. A stationary drying process may be suitable for this heating step, while continuous IR heating may help rapidly evaporate any volatile parts of coating. The setup of IR heating for a crosslinking polyvinyl acetate coating may be referenced to the aforementioned preheating process. For example, the temperature of the IR heater can be set in a range of about 400° F. to about 1500° F. Similarly to the preheating procedure, the surface temperature of the crosslinking polyvinyl acetate coating may be in a range between about 80° F. and about 250° F. The heating/curing time may need to be about 1 minute to about 10 minutes for each coating layer, depending on the heat intensity and heating efficiency of the heating apparatus used. The speed of conveyor while a fabric product is in the curing tunnel may be set so that the coating reaches a curing rate of about 80% or more before the coated fabric product exits the heating zone. The total heating/curing time for applying two crosslinking polyvinyl acetate coating layers on the natural fabric may be about 5 minutes to about 15 minutes.

During heating, a set of fans or a ventilation system may be used to remove the moisture from the crosslinking polyvinyl acetate coating. They may accelerate the evaporation of moisture in the wet coating and result in a uniform film on a fabric product. In some other cases, the heating temperature, heating distance and surface temperature of crosslinking polyvinyl acetate coating may be appropriately adjusted, as needed. Furthermore, the fans may be used to avoid overheating or surface burning during the heating process and they are installed either underneath or adjacent to the heating chamber of a heating apparatus to improve heat circulation at the surface of the fabric product. The air circulation direction (e.g., the orientation of the fans) can be vertical or horizontal to the coated surface of the fabric product. Air circulation over and across the coated surface of the fabric product (e.g. horizontally oriented air circulation) may also help dry the coated fabric product, which may also be desirable. The hot surface of the coated fabric products after exiting from the tunnel may help evaporate the moisture of the crosslinking polyvinyl acetate coating and increase its curing speed.

In at least some other cases, a water resistant paint or coating for a natural fabric product may include acrylic, alkyd, asphalt, lacquer, latex, polyurethane, emulsion polymer isocyanate, epoxy resins (including bisphenol A, bisphenol F, novolac, aliphatic, and glycidylamine epoxy), vinyl ester, urethane, silicone coating including silicone polyester and silicone alkyd, polyvinyllidene fluoride, etc. For the invention, these regular coating or paints are usually applied over the cured crosslinking polyvinyl acetate adhesive as a second or exterior coating for the natural fabric.

Unlike a wood member, most of the natural fabric products are relatively flexible and have a number of gaps or empty sections between or among the fibers or yarns in the weave structure. These empty or porosity areas are larger in size than those in a wood member. Hence, the crosslinking polyvinyl acetate coating or emulsion adhesive may easily fill in these porosity areas or parts of a natural fabric and bond with adjacent weaving fibers or yarns to provide stiffness to the natural fabric. Moreover, the strength properties (e.g., bending, compression, or tensile strengths) of a natural fabric may also be increased because the crosslinking polyvinyl acetate helps effectively transfer the stress between and among the bonded fibers or yarns when the fabric is under an exterior force or load.

According to the inventor's experiments, the stiffness and strength of the coated fabric are related to the coating amount of crosslinking polyvinyl acetate. Therefore, the final stiffness and strength of the coated fabric may be adjusted to meet the product design and application requirements.

A crosslinking polyvinyl acetate emulsion polymer or adhesive used for the invention may only stay on the exterior surface of a natural fabric or textile product because it has a high molecular weight and large molecular chains to meet the requirement of high Fruehauf wet shear strength. In order to verify this fact the following experiment was conducted by the inventor: After the crosslinking polyvinyl acetate adhesive was applied and cured on a natural fabric, the coated fabric was cross-cut with scissors. By observing the cross-cut section under a microscope, the crosslinking polyvinyl acetate coating was indeed free of penetration into the fibers although some big gaps or voids of the fabric surface were already filled by the coating layer. This feature helps effectively prevent the coating from coating starving, air bulbs, foaming, or pin holes in the formed coating film, or other coating defects on the coated fabric due to penetration into the fibers, thus saving the coating amount and cost.

A nonwoven fabric product may be also coated with a crosslinking polyvinyl acetate adhesive for surface protection. Unlike the waterproofing composition of U.S. Pat. No. 5,190,997 by Lindemann, however, the crosslinking polyvinyl acetate coating used for the invention cannot work as fiber filler but only stays on the exterior surfaces of the fabric due to its large molecular chains and high molecular weight. The crosslinking polyvinyl acetate coating may fill into the big gaps or voids of the nonwoven fabric, but it cannot penetrate into the fibers of the nonwoven fabric. It only forms a continuous film on the exterior surfaces of the woven or nonwoven fabric.

The crosslinking polyvinyl acetate adhesive or coating may provide a new function to a preservative or biocide-treated natural fabric. The crosslinking polyvinyl acetate coating can help fix the preservative or its active elements on the fabric by chelating and bonding with them. This may effectively reduce the leaching out of the preservative or biocide and help maintain its function during service.

For the invention, the color of the coated natural fabric is mainly related to the topcoat applied over the cured crosslinking polyvinyl acetate primer or the fabric substrate. Since the crosslinking polyvinyl acetate used as a primer or a first coating layer may fully or partially block the color of the natural fabric, the coated fabric may be semi-transparent or opaque in color, depending on the product design or the customer's needs. For the invention, hence, the color and texture of the original natural fibers may not be easily identified because they may be sealed by the crosslinking polyvinyl acetate coating or the regular paint of asphalt, acrylic, epoxy, latex, alkyd, emulsion polymer isocyanate, polyurethane, urethane and the like.

More importantly, the natural fabric or textile product coated by the crosslinking polyvinyl acetate adhesive is compatible to receive any hydrophilic or oleophilic paints. For example, the finishing surface of the crosslinking polyvinyl acetate-coated natural fabric can be further coated with acrylic, asphalt, latex and other water-based paints or coatings. It is also suitable to apply an oleophilic paint or coating like alkyd, epoxy, lacquer, urethane, polyurethane, etc. over the cured crosslinking polyvinyl acetate coating layer on the natural fabric. Accordingly, such a unique coating feature of the crosslinking polyvinyl acetate coated-fabric definitively benefits to further application of different paints or the second coating layer of crosslinking polyvinyl acetate over the cured crosslinking polyvinyl acetate primer.

Based on the inventor's experimental results, the crosslinking polyvinyl acetate coating can significantly improve the water resistance of a natural fabric product and effectively maintain its mechanical performance in an outdoor or a wet condition, thus resulting in enhancing its service life and durability in the natural environment.

EXAMPLES

The invention may be further clarified by reference to the following examples, which serve to exemplify some of the preferred embodiments, but not to limit the invention in any way.

Example 1

A piece of cotton, linen, or canvas curtain is used in this example. A Type II crosslinking polyvinyl acetate adhesive is used as a coating and has a solid content of about 15% to about 60% by weight. The curtain fabric is coated with the crosslinking polyvinyl acetate through a glue spreader. The coating amount of crosslinking polyvinyl acetate is controlled to be between about 20 g/sq. ft. to about 60 g/sq. ft. After coating, the curtain fabric is heated by an IR heater and cured or gradually cured at room temperature. The coated curtain can be used as a window curtain or covering sheet. It may be exposed to sunshine or UV light in an indoor condition.

Example 2

A canvas sheet is coated with a Type I crosslinking polyvinyl acetate emulsion adhesive. The solid content of crosslinking polyvinyl acetate is between about 30% to about 70% by weight. Before coating, the canvas fabric is preheated with an IR heater to maintain a surface temperature of about 80° F. to about 100° F., about 110° F. to about 130° F., or about 140° F. to about 170° F., or about 180° F. to about 210° F. and then passes through a glue spreader. The coating amount of crosslinking polyvinyl acetate is controlled to be between about 10 g/sq. ft. to about 60 g/sq. ft. After coating, the canvas fabric is heated again by another IR heater at a similar temperature range and cured.

A regular paint of acrylic, alkyd or asphalt is then sprayed over the above cured crosslinking polyvinyl acetate primer as a second coating layer. The coating amount of acrylic, alkyd or asphalt is between about 20 g/sq. ft. to about 60 g/sq. ft. The canvas is untouched until all coating layers are completely dried out. The canvas sheet can be further coated with multiple coats of the regular paint over the cured primer. The coated canvas can be used as outdoor tents, sails, landscape protecting sheets, outdoor covering layers, roofs, etc.

Example 3

A piece of fabric cloth is woven or fabricated from kneaf, hemp, jute, or coir fibers. Alternatively, it may be a mixture of kneaf with hemp, jute, or coir. For instance, the mixing ratio can be 50% kneaf vs. 50% coir, or 50% kenaf vs. 50% jute, or 50% kenaf vs. 50% hemp, or 40% hemp vs. 30% coir vs. 30% jute, or 40% kenaf vs. 30% hemp vs. 30% jute, or 25% kenaf vs. 25% hemp vs. 25% jute vs. 25% coir. The natural fabric can also be fabricated with wool, camel fibers, lyocell, rayon, Tencel or the combination thereof. These are just examples. The fabric is between about 6% to about 15% in moisture content.

The cloth is sprayed, brushed or roller coated with a crosslinking polyvinyl acetate emulsion polymer. The coating amount of crosslinking polyvinyl acetate is between about 10 g/sq. ft. to about 100 g/sq. ft. The solid content of crosslinking polyvinyl acetate is between about 20% to about 60% by weight. Moreover, the crosslinking polyvinyl acetate has a minimum Fruehauf wet shear strength of 175 psi. After the crosslinking polyvinyl acetate adhesive is cured, a regular paint of acrylic, alkyd, urethane, epoxy, or asphalt is further sprayed, roller-coated, or brushed over the cured primer as a second coating layer. The coating amount of acrylic, alkyd, urethane, epoxy, or asphalt is in the range of about 20 g/sq. ft. to about 60 g/sq. ft. After being completely dried out, the coated cloth becomes stiff and is excellent in water resistance and dimensional stability. The above coated natural fabric material may be used as a cushion, a door mat, a hall mat, a patio mat, a chair seat, etc. in an indoor or semi-outdoor condition.

Example 4

A netting fabric with yarn or string grids and knots is fabricated from cotton, hemp, jute, sisal, flax or other natural fibers. The netting is firstly soaked in a Type I crosslinking polyvinyl acetate adhesive for about 5 minutes to about 30 minutes. The soaked netting is then hung in air to drip off the extra adhesive and the residual adhesive coating is further squeezed out through a series of plastic pinch rollers. The netting fabric is stretched out for drying to avoid the grids or the netting components touching each other during curing. The solid content of crosslinking polyvinyl acetate is between about 30% to about 70% by weight and has a minimum Fruehauf wet shear strength of 325 psi.

After the crosslinking polyvinyl acetate is cured, the netting fabric is further sprayed or roller coated with a regular paint or coating such as acrylic or asphalt emulsion over the cured crosslinking polyvinyl acetate as a topcoat. Finally, the painted netting fabric is completely dried out. The coated netting fabric can be used for landscape protection, roof protection, soccer gate nets, basketball or tennis ball nets, fences, etc.

Example 5

Two types of commercially purchased natural fabric materials were used in this example. One was cotton canvas cloth, while the other, a jute cloth. Both were plain weave in structure. The thickness of these canvas and jute fabrics was about 0.015 inch and about 0.030 inch, respectively. The canvas was woven with tiny voids in the intersecting grids, while the jute was a netlike fabric with voids which were about 1/16 inch by about one 1/16 inch in dimension.

Each fabric was cut by scissors into a piece of cloth sample with a dimension of about 4 inches in width by about 6 inches in length. All jute fabrics had a single layer. For canvas, one sample had a double-layer structure and was bonded with two pieces of single-layer canvas by a crosslinking polyvinyl acetate emulsion adhesive, while the rest were single-layer cloth. Each jute fabric had a weight of about four grams (i.e., 0.14 oz.). The single layer canvas weighed about six grams (i.e., about 0.21 oz.), while the double-layer one, about 12 grams (i.e., about 0.42 oz.). Prior to a coating treatment, all fabric samples were stored in room conditions for three days.

Ten pieces of the above fabric samples in total were used for this example. Among them, four were jute weaves, while six, canvas. One of jute and two of canvas were used as a control, respectively, and had no coating treatment. All the rest of jute and canvas were firstly coated on both surfaces with a crosslinking polyvinyl acetate adhesive by brushing. After curing, the coating amount of the crosslinking polyvinyl acetate on the dry fabrics was about 60% by weight for canvas and about 75% by weight for jute, respectively.

One of the above coated single-layer jute and canvas cloths was further coated by acrylic as a second coating on these fabrics, respectively. For both coated fabrics, the dry coating amount of acrylic on the cured crosslinking polyvinyl acetate was about 50% by weight. All coated fabric samples were placed indoors for one week until they were fully cured.

Example 6

A water soaking test was conducted to the above coated and uncoated jute and canvas fabrics in Example 5 at room temperature. All fabric specimens were completely submerged in a plastic container. They were kept one inch below the water level in the container at room temperature during soaking. Each specimen was weighed at the intervals of 1 hour, 12 hours and 24 hours, respectively.

According to Table 2, the uncoated jute weave fabric had a constant water absorption rate of about 250% by weight starting at a soaking period of one hour, while the uncoated canvas cloth started a constant absorption rate of about 140% by weight after four hour soaking (not shown in the table).

TABLE 2

Water absorption of coated and uncoated natural fabrics

| Fabric sample | Coating layer | Coating structure | Water absorption rate, % by weight | | |
|---|---|---|---|---|---|
| | | | 1 hr. | 12 hr. | 24 hr. |
| Jute | 0 | Uncoated | 250.0 | 250.0 | 252.3 |
| Jute | 1 | XPVAc | 55.8 ± 3.5 | 52.4 ± 2.5 | 51.0 ± 0.5 |
| Jute | 2 | 1$^{st}$: XPVAc/ 2$^{nd}$: Acrylic | 31.8 | 41.1 | 41.1 |
| Canvas | 0 | Uncoated | 122.4 ± 8.5 | 142.0 ± 6.1 | 138.7 ± 10.7 |
| Canvas | 1 | XPVAc | 37.1 ± 1.3 | 35.6 ± 0.8 | 39.0 ± 0.0 |
| Canvas | 2 | 1$^{st}$: XPVAc/ 2$^{nd}$: Acrylic | 24.0 | 29.5 | 29.5 |

XPVAc: Crosslinking polyvinyl acetate. The values after the "±" marks are standard deviation.

It is clearly indicated in Table 2 that all coated fabrics had much less water absorption than their corresponding untreated ones. For example, the crosslinking polyvinyl acetate-coated jute and canvas fabrics significantly reduced the water absorption by about four fifth and about three fourth, respectively, compared with the untreated controls at the same soaking period of 24 hours. More importantly, the two-layer coated fabrics with a crosslinking polyvinyl acetate primer and an acrylic topcoat can further reduced the water absorption from about 250% to about 40% for jute and from about 140% to about 30% for canvas.

Example 7

After the soaking test of Example 6, all the coated and uncoated jute and canvas fabric samples were air-dried in room conditions for one week. Afterward, a field test was conducted for these samples in the Minnesota weathering conditions. All fabric samples were hung on a string at a span of 3 to 4 inches one another. The string was fastened on two posts and about two feet above ground.

After one-month outdoor exposure, the uncoated canvas had a number of mold developed on its surface. The jute weave did not have any mold but the fibers were fluffy. It was deformed in shape. In contrast, all coated jute and canvas fabrics were intact and had no mold on the surfaces. The coated fabrics were stable in dimension and shape after one-month exposure. Moreover, both coated fabrics were as stiff as those before the field test whether they were single or double coated.

After four-month exposure, the uncoated canvas continued molding with fluffy surfaces, while the uncoated jute fabric was fluffy and deformed and its color started fading. However, all fabric samples coated with crosslinking polyvinyl acetate were intact and kept their stiffness and had no dimensional change. After ten-month exposure, the uncoated canvas and jute fabric samples were deformed badly and almost faded in color, while the uncoated canvas fabric was seriously attacked by mold. However, all fabric samples coated with crosslinking polyvinyl acetate were intact and kept their stiffness and had no mold issue and no dimensional change.

Example 8

A natural fiber chevron mat was purchased commercially and had a dimension of 20 inches by 32 inches. It was woven by 55% jute and 45% cotton with plain weave. In addition, the jute warps were intersected with the cotton wefts.

One half of the mat was firstly coated with a Type I crosslinking polyvinyl adhesive, whereas the other was uncoated and used as a control. The crosslinking polyvinyl acetate had a minimum Fruehauf wet shear strength of 325 psi and was about 60 g/sq. ft. in coating amount. After the adhesive was completely cured, half of the uncoated and coated sections were further coated with acrylic, respectively, with a coating amount of about 60 g/sq. ft. The crosslinking polyvinyl acetate-coated section was stiff and flat compared with the uncoated one with a soft and flexible structure. After coating, the coated chevron was kept indoors for one week.

The coated mat was then placed outdoors for a field test and hung on rails and three feet away from ground. After one-month exposure, the uncoated fibers started fading. The whole uncoated section was shrunk and deformed. In contrast, the crosslinking polyvinyl acetate-coated quarter and the double-coated quarter were intact and had very good dimensional stability. After two-month exposure, all crosslinking polyvinyl acetate-coated quarters were intact and maintained well in stiffness. After eight-month exposure, the uncoated mat section was deformed badly and shrunk by over 15%. In addition, the fiber dye was fading and almost gone. In contrast, the crosslinking polyvinyl acetate-protected section was intact and had no fading. It kept well in shape and stiffness. The above mat protected by the crosslinking polyvinyl acetate coating may be used as a door or patio mat, an outdoor cushion, a seat or deck section of an outdoor furniture, etc.

Example 9

A hemp fabric was used in this example. The fabric had a plain weave structure. The hemp fabric had a void size of about 3/16 inch by about 3/16 inch in each intersected weft-warp grid. The fabric was about 72 inches by about 30 inches in dimension.

Half of the fabric was firstly coated with a Type I crosslinking polyvinyl acetate adhesive as a primer on its top and bottom surfaces. The coating amount of the crosslinking polyvinyl acetate was about 36 g/sq. ft. and had a minimum Fruehauf wet shear strength of 325 psi. After the adhesive was dried out, acrylic was further applied on both surfaces with a coating amount of about 30 g/sq. ft. The acrylic coating only covered half of the area coated by the crosslinking polyvinyl acetate. That is, it accounted for about one quarter of the whole fabric. For the other half section, one quarter of it was coated with acrylic on both surfaces with a coating amount of about 36 g/sq. ft., while another quarter was uncoated and used as control. After being dried for one week in an indoor condition, the whole hemp fabric was placed on a lawn and exposed to outdoor conditions.

After one-month exposure, the uncoated and acrylic-coated sections of the hemp fabric became fluffy and were deformed. All the fabric sections coated with the crosslinking polyvinyl acetate maintained well their dimension and shape. In addition, the crosslinking polyvinyl acetate-coated hemp fabric sections were intact and had no mold and fungal attack. After six-month exposure, the uncoated hemp fabric section started wrinkling and became dark in color. The uncoated fabric section was wet in most time, while the acrylic-coated section started fading and losing paint. In contrast, the crosslinking polyvinyl acetate-coated and protected section was intact and kept its stiffness and dimensional stability, and had no color fading and no mold or fungal attack.

Example 10

A jute fabric was used for this example. The fabric had a plain weave structure. The jute fabric was tightly fabricated and had very small voids in the weft-warp intersections. The fabric was about 80 inches by about 28 inches in dimension.

Half of the fabric was firstly coated with a Type I crosslinking polyvinyl acetate emulsion polymer as a primer on its top and bottom surfaces. The coating amount of the crosslinking polyvinyl acetate was about 40 g/sq. ft. and had a minimum Fruehauf wet shear strength of 325 psi. After the emulsion polymer was cured, acrylic was further applied on both surfaces with a coating amount of about 30 g/sq. ft. The acrylic coating only covered half of the area of the cured crosslinking polyvinyl acetate. That is, the acrylic coating accounted for about one quarter of the whole fabric. For the other half section, one quarter was coated with acrylic on both surfaces at a coating amount of about 40 g/sq. ft., while another quarter was uncoated and used as control. After being dried for one week in an indoor condition, the whole fabric was then placed on a lawn lot for outdoor exposure.

After one-month exposure, the uncoated and acrylic coated sections became fluffy and soft and were deformed. All the fabric sections coated with the crosslinking polyvinyl acetate maintained its dimension stability as before. In addition, all crosslinking polyvinyl acetate-coated fabric sections were intact and had no mold and fungal attack. After six-month exposure, the uncoated jute fabric section started wrinkling and became dark in color. The uncoated fabric section was wet, while the acrylic-coated section started fading and losing paint. In contrast, the crosslinking polyvinyl acetate coated-fabric section was intact and maintained its stiffness and dimensional stability, and had no color fading and no mold and fungal attack.

The above crosslinking polyvinyl acetate-coated natural fabric products and examples are herein described in certain embodiments which are used only for a presentation. The descriptions may be subject to changes, modifications, and substitutions without falling out of the spirit of the invention.

This completes the description of the preferred and alternate embodiments of the invention. Those skilled in the art may recognize other equivalents to the specific embodiment described herein.

What is claimed is:

1. A waterproofing composition for a natural fabric or textile product which is woven, knitted, or fabricated from natural fibers, yarns, or threads, comprising:
    a crosslinking polyvinyl acetate adhesive applied and cured on exterior surfaces of the natural fabric product as a first coating layer and a coating selected from the group consisting of acrylic, alkyd, asphalt, emulsion polymer isocyanate, epoxy, lacquer, latex, polyurethane, urethane, and vinyl ester applied over the cured crosslinking polyvinyl acetate adhesive as a second coating layer on said product;
    wherein said yarns or threads are twisted or spun from the natural fibers;
    wherein said adhesive includes a polyvinyl acetate-based adhesive resin, a copolymer, a crosslinking agent, and a catalyst and is a Type I or Type II adhesive;
    wherein said adhesive forms into a coating film on at least a part of the exterior surfaces of said product as a protective coating which is free of penetration into the fibers of said product and provides surface protection to said product; and
    wherein said adhesive when cured consists of a first bonding as coating film to bond and seal the exterior surfaces of said product, and a second bonding in which said adhesive fills gaps or voids between or among adjacent weaving fibers, yarns or threads on the exterior surfaces of said product and bonds together said fibers, yarns or threads, such that said adhesive is on the exterior surfaces of said products.

2. The waterproofing composition of claim 1, wherein said product comprises warps and wefts in weave structure or pattern.

3. The waterproofing composition of claim 1, wherein the crosslinking polyvinyl acetate adhesive has a solid content in the range of about 15% to about 70% by weight.

4. The waterproofing composition of claim 1, wherein the dry coating thickness of said adhesive applied on said product is in the range between about 0.001 inch and about 0.050 inch.

5. The waterproofing composition of claim 1, wherein said film of said adhesive is continuous on said product after cured.

6. The waterproofing composition of claim 1, wherein said adhesive is crosslinked and cured at a temperature of not higher than 250° F. or 121° C.

7. A natural fabric or textile product which is woven, knitted, or fabricated from natural fibers, yarns, or threads including at least one exterior surface, said exterior surface receiving a waterproofing composition comprising at least a crosslinking polyvinyl acetate adhesive applied and cured on said product as a first coating layer or a primer; said yarns or threads being twisted or spun from the natural fibers;
    wherein said product at least comprises a warp composition element in the formed weave structure;

wherein the crosslinking polyvinyl acetate adhesive at least includes a polyvinyl acetate-based adhesive resin, a crosslinking agent and a catalyst, and is a Type I or Type II adhesive;

wherein said adhesive is crosslinked and cured at a temperature of not higher than 250° F. or 121° C.;

wherein said adhesive forms into a coating film on at least one portion of the exterior surface of said product as a protective coating which is free of penetration into the fibers of said product and provides surface protection to said product; and wherein said adhesive when cured consists of a first bonding as coating film to bond and seal the exterior surface of said product, and a second bonding in which said adhesive fills gaps or voids between or among adjacent weaving fibers, yarns or threads on the exterior surface of said product and bonds together said fibers, yarns or threads, such that said adhesive is on the exterior surface of said products.

8. The natural fabric product of claim 7, wherein said adhesive has been cured after applied on said product prior to contacting any other products.

9. The natural fabric product of claim 7, wherein said adhesive has a minimum Fruehauf wet shear strength of 175 psi when applied and cured on said product as a topcoat for an indoor application.

10. The natural fabric product of claim 7, wherein said adhesive has a minimum Fruehauf wet shear strength of 325 psi when applied and cured on said product as a topcoat for a semi-outdoor or outdoor application.

11. The natural fabric product of claim 7, wherein the cured crosslinking polyvinyl acetate primer on said product is further coated with a paint or coating selected from the group consisting of acrylic, alkyd, asphalt, emulsion polymer isocyanate, epoxy, lacquer, latex, polyurethane, urethane, and vinyl ester as a second coating layer or a topcoat of said product.

12. The natural fabric product of claim 7, wherein said adhesive is applied onto said product by roller coating, spray coating, impregnation soaking, dipping, brush coating, curtain coating, extrusion coating, or manually coated with a brush or a roller.

13. The natural fabric product of claim 7, wherein the coating layer of said adhesive after applied on said product is heated at the surface temperature of about 80° F. to about 250° F. until said adhesive is cured.

14. The natural fabric product of claim 13, wherein the heating sources include electricity, microwave, steam, hot water, solar heating, oil heating, and ceramic heating.

15. The natural fabric product of claim 7, wherein said adhesive provides stiffness to said product by filling gaps and voids, which are visible to a bare eye, of said product and bonding adjacent weave fibers or yarns on the exterior surfaces of said product when applied and cured.

16. The natural fabric product of claim 7, wherein said adhesive improves the stiffness, water resistance and dimensional stability of said product when applied and cured on said product.

17. The natural fabric product of claim 7, wherein said adhesive enhances strength properties of said product by transferring stress between and among the bonded fabric fibers, threads or yarns of said product when said product is under an exterior force or load.

18. A natural fabric or textile product which is woven, knitted, or fabricated from natural fibers, yarns, or threads, comprising:

a crosslinking polyvinyl acetate adhesive applied and cured on at least one exterior surface of said product as a first coating layer or a primer and a coating selected from the group of acrylic, alkyd, asphalt, emulsion polymer isocyanate, epoxy, lacquer, latex, polyurethane, urethane, and vinyl ester applied over the cured crosslinking polyvinyl acetate adhesive as a second coating layer or a topcoat; said yarns or threads being twisted or spun from said fibers;

wherein said product comprises at least one composition element of warps and wefts in weave structure or pattern;

wherein said adhesive forms into a continuous coating film on at least a part of the exterior surfaces of said product as a protective coating;

wherein said adhesive includes a polyvinyl acetate-based adhesive polymer, a copolymer, a crosslinking agent, and a catalyst and is a Type I or Type II adhesive;

wherein said adhesive is crosslinked and cured at a temperature of not higher than 250° F. or 121° C.;

wherein said adhesive when cured consists of a first bonding as coating film to bond and seal the exterior surface of said product, and a second bonding in which said adhesive fills gaps or voids between or among adjacent weaving fibers, yarns or threads on the exterior surface of said product and bonds together said fibers, yarns or threads, such that said adhesive is on the exterior surface of said products;

wherein said adhesive is free of penetration into the fibers of said fabric or product; and wherein said adhesive improves the water resistance, rigidity or stiffness, strength, and dimensional stability of said product as a protective coating when applied and cured on said product, and provides surface protection to said product.

* * * * *